United States Patent
Saville et al.

(10) Patent No.: US 6,752,533 B2
(45) Date of Patent: Jun. 22, 2004

(54) FOIL THRUST BEARING COOLING

(75) Inventors: Marshall Saville, Torrance, CA (US); Keith A. Hurley, Garden Grove, CA (US); Joseph B. Borghese, Yucca Valley, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/295,352

(22) Filed: Nov. 15, 2002

(65) Prior Publication Data

US 2004/0096130 A1 May 20, 2004

(51) Int. Cl.⁷ .............................................. F16C 17/06
(52) U.S. Cl. .................................... 384/105; 384/106
(58) Field of Search ................................. 384/106, 105, 384/103, 122

(56) References Cited

U.S. PATENT DOCUMENTS

| | | | |
|---|---|---|---|
| 4,082,375 A | 4/1978 | Fortmann | |
| 4,208,076 A | 6/1980 | Gray et al. | |
| 4,213,657 A | 7/1980 | Gray | |
| 4,227,753 A | 10/1980 | Wilcock | |
| 4,247,155 A | 1/1981 | Fortmann | |
| 4,277,111 A | 7/1981 | Gray et al. | |
| 4,277,113 A | 7/1981 | Heshmat | |
| 4,462,700 A | 7/1984 | Agrawal | |
| 4,597,677 A | 7/1986 | Hagiwara et al. | |
| 4,621,930 A | 11/1986 | Gu et al. | |
| 4,624,583 A | 11/1986 | Saville et al. | |
| 4,668,106 A | 5/1987 | Gu | |
| 4,682,900 A | 7/1987 | Gu | |
| 4,701,060 A | 10/1987 | Gu | |
| 4,767,221 A | 8/1988 | Paletta et al. | |
| 4,871,267 A | 10/1989 | Gu | |
| 5,110,220 A | 5/1992 | Gu | |
| 5,209,579 A | 5/1993 | Matake | |
| 5,248,205 A | 9/1993 | Gu et al. | |
| 5,318,366 A | 6/1994 | Nadjafi et al. | |
| 5,498,082 A | 3/1996 | Nadjaft | |
| 5,529,398 A | 6/1996 | Bosley | |
| 5,540,505 A | 7/1996 | Struziak | |
| 5,547,286 A | 8/1996 | Struziuk | |
| 5,827,040 A | 10/1998 | Bosley et al. | |
| 5,833,369 A | 11/1998 | Heshmat | |
| 5,871,284 A | 2/1999 | Nadjafi et al. | |
| 5,918,985 A | 7/1999 | Bosley | |
| 5,938,341 A | 8/1999 | Eccles | |
| 5,961,217 A | 10/1999 | Heshmat | |
| 6,224,263 B1 | 5/2001 | Saville et al. | |
| 6,261,002 B1 | 7/2001 | Ermilov et al. | |
| 6,354,741 B1 | 3/2002 | Saville et al. | |

*Primary Examiner*—Tinard A. Footland
(74) *Attorney, Agent, or Firm*—Oval Caglar, Esq.

(57) ABSTRACT

An improved foil thrust bearing includes a cooling fluid flow turbulence generating disk placed between other foil thrust bearing elements, such as thrust bearing elements and under-spring elements. The inventive turbulence generating disk generally provides improved transfer of heat through the foil and into the cooling fluid of foil thrust bearings that may be used for high rotor speed applications. It accomplishes this by improving the transfer of heat through the foil and into the cooling fluid by generating turbulent cooling flow adjacent to the back of the top foil. The turbulent flow is generated primarily by a series of turns or protrusions introduced into the cooling flow stream. Alternate embodiments are disclosed that provide the turbulence generating elements as part of the underside of thrust bearing elements.

45 Claims, 7 Drawing Sheets

FOIL THRUST BEARING COOLING

BACKGROUND OF THE INVENTION

The present invention generally relates to apparatus and methods for cooling foil thrust bearings and, more specifically, to apparatus and methods for improving the transfer of heat through the foil and into the cooling fluid of foil thrust bearings.

Foil thrust bearings are very attractive for high speed rotating machinery, such as, for example, a turboalternator-generator, turbocompressors, and motor driven compressors. One of the benefits of such bearings is that they do not require oil-based lubrication and the corresponding high maintenance costs generally attributable to oil-based lubricating systems. Instead of using oil, foil thrust bearings generally use readily available ambient atmosphere air as the lubricating and cooling fluid, although other lubricating fluids, including methane, water, or gaseous or liquid hydrogen, nitrogen, or oxygen, may be used.

Foil thrust bearings generally comprise two members which rotate with respect to each other and which are positioned such that a predetermined space between them is filled with the lubricating and cooling fluid. Foils (or thin sheets of compliant material) disposed in the space are deflected by the hydrodynamic film forces between the adjacent bearing surfaces. The foils enhance the hydrodynamic characteristics of the bearing, provide support between the bearing and the runner, accommodate eccentricity between the relatively movable members, and also provide a cushioning and dampening effect.

To properly position the foils between the movable bearing members, it is known in the art to mount a plurality of individually spaced foils on a foil or thrust bearing disk and position the disk on one of the bearing members. Another similar common practice has been to provide separate compliant stiffener elements or undersprings beneath the foils to supply the requisite compliance.

Compliant hydrodynamic bearings are a well known class of foil thrust bearings, and have been praised for their high rotor speed capability as well as their ability to tolerate rotor/bearing misalignment and thermal distortion. These capabilities, along with the ability to use the machine's own process fluid as the bearing lubricant, have made compliant hydrodynamic bearings an attractive alternative for use in high-speed turbomachinery applications.

Hydrodynamic bearings support bearing loads by generating fluid pressure through viscous shear of the bearing lubricant into a converging geometry or "wedge" bounded by the bearing surfaces. This shearing action is provided by and is in the direction of the relative motion of the bearing surfaces. This shearing action also generates heat. The rate of heat generation is proportional to the dynamic viscosity and the square of the relative surface speed and inversely proportional to the film thickness. Thus, heavily loaded bearings having thin hydrodynamic film thickness and operating at high surface speeds produce a significant amount of heat that must be removed in order to avoid excessive bearing temperatures.

Many compliant bearing inventors have disclosed methods to improve bearing load capacity by optimizing the shape of the bearing's hydrodynamic fluid film. An example of this approach is U.S. Pat. No. 5,318,366 to Nadjafi, et. al. which teaches use of variable width spring "fingers" in order to tailor spring stiffness as a means to optimize hydrodynamic wedge shape and provide high load capability. However, bearing cooling schemes have been given much less attention although thermal distortion of the bearing components and temperature limitations of fluid foil coatings do limit the load supporting capacity of these bearings. Thus, bearing cooling is an important design consideration.

One prior art example addressing a bearing cooling scheme is U.S. Pat. No. 4,247,155 to Fortmann. This invention introduces a single piece top foil with perforations to channel cooling flow into the hydrodynamic wedge, and to reduce the bending stiffness of the single piece top foil so as to facilitate the creation of a plurality of bearing pads under the hydrodynamic pressure load. In this application, cooling flow through the spring structure travels in essentially straight-through paths, and there is no attempt made to tailor cooling air flow such as to maximize convective heat transfer.

In many applications, as in an air cycle machine, air is the process fluid and is also the bearing lubricant. In this case, the bearings are generally cooled by bleeding pressurized air from the air cycle machine's compressor outlet, and channeling it through the bearing's spring support structure. This cooling flow is predominately radial for a thrust bearing. Some of this flow enters the bearing's hydrodynamic film, replenishing lubricant lost to bearing side leakage. Side leakage is that portion of the lubricant that leaks out of the axial ends of the journal bearing (or out of the inside diameter and outside diameter of a thrust bearing) as it flows into the converging hydrodynamic wedge. Some of the bearing heat is removed as this heated fluid mixes with the cooling flow and is carried along downstream of the bearing. However, side leakage only removes a small percentage of the heat, and most of the heat is removed through convection between the underside of the "hot" fluid foil (i.e. the surface facing away from the hydrodynamic film) and the cooling flow through the support structure. Further, the cooling air that comes in direct contact with the underside of the hot foil provides the most efficient convection heat transfer. Bearing cooling can be increased by simply increasing cross sectional cooling flow area. However, this is inefficient in that it requires more air than necessary to be bled off the compressor and the overall efficiency of the turbomachine will be degraded.

As can be seen, there is a need for an improved foil and thrust bearing that makes use of proven principals from heat exchanger design and applies them to the bearing structure in order to maximize convective heat transfer and minimize the rate of cooling flow that is required to remove the heat generated in the bearings.

SUMMARY OF THE INVENTION

In one aspect of the present invention, there is disclosed a foil thrust bearing, comprising a thrust runner and a thrust plate arranged for relative rotation with respect to one another; a thrust bearing disk operably disposed adjacent said thrust runner; an underspring element operably disposed adjacent said thrust plate; a turbulence generating disk operably disposed between said thrust bearing disk and said underspring element; a plurality of turbulator elements integral to said turbulence generating disk, positioned on the inner annular ring edge of said turbulence generating disk, and directed radially toward the center of said turbulence generating disk; and cooling fluid flow directed from the outside diameter to the inside diameter of said foil thrust bearing and along said turbulator elements of said turbulence generating disk.

In another aspect of the present invention, there is disclosed a foil thrust bearing, comprising a thrust runner and a thrust plate; a thrust bearing disk adjacent said thrust runner; an underspring element adjacent said thrust plate; a turbulence generating disk between said thrust bearing disk and said underspring element, said turbulence generating disk comprising a plurality of turbulator elements directed radially toward the center; and, cooling fluid flow directed radially along said turbulator elements of said turbulence generating disk.

In another aspect of the present invention, there is disclosed a system for cooling foil thrust bearings for high speed rotating machinery, comprising a foil thrust bearing further comprising a thrust runner and a thrust plate arranged for relative rotation with respect to one another; a thrust bearing disk disposed adjacent said thrust runner; an underspring element disposed adjacent said thrust plate; a turbulence generating disk, disposed between said thrust bearing disk and said underspring element, and comprising a plurality of turbulator elements positioned on the inner annular ring edge and directed radially toward the center of said turbulence generating disk; and, turbulent cooling fluid flow along said turbulator elements and directed to said foil thrust bearing.

In another aspect of the present invention, there is disclosed a method for cooling foil thrust bearings for high speed rotating machinery, comprising the steps of: rotating a thrust runner in relation to a thrust plate; inserting a thrust bearing disk and an underspring element between said rotating thrust runner and thrust plate; inserting, between said thrust bearing disk and said underspring element, a turbulence generating disk comprised of turbulator elements positioned on the inner annular ring edge and directed radially toward the center of said turbulence generating disk; generating cooling fluid pressure by bleeding pressurized fluid from said high speed rotating machinery; and, generating turbulent cooling fluid flow by directing said cooling fluid flow through said turbulator elements of said turbulence generating disk.

In yet one further aspect of the present invention, there is disclosed a method for cooling foil thrust bearings for rotating machinery, comprising the steps of: rotating a thrust runner in relation to a thrust plate; inserting a thrust bearing disk, a turbulence generating disk, and an underspring element between said rotating thrust runner and thrust plate; generating cooling fluid pressure by bleeding pressurized fluid from said rotating machinery; and, generating turbulent cooling fluid flow by directing said cooling fluid flow through said turbulence generating disk.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides improved transfer of heat through the foil and into the cooling fluid of foil thrust bearings that may be used in high speed rotating machinery, such as turboalternator-generators, turbocompressors, and motor driven compressors. It accomplishes this by making use of proven principals from heat exchanger design and applies them to the bearing structure in order to maximize convective heat transfer and minimize the rate of cooling flow that is required to remove the heat generated in the bearings. More specifically, the invention improves the transfer of heat through the foil and into the cooling fluid by generating turbulent cooling flow adjacent to the back of the top foil. The turbulent flow is generated primarily by a series of turns or protrusions introduced into the cooling flow stream. This is unlike prior art designs, which provide for laminar cooling fluid flow adjacent to the top foil. Laminar flow is not as effective as turbulent flow in transferring heat from the top foil and large amounts of fluid can be required to provide sufficient cooling to prevent foil or runner damage.

Figure 1:
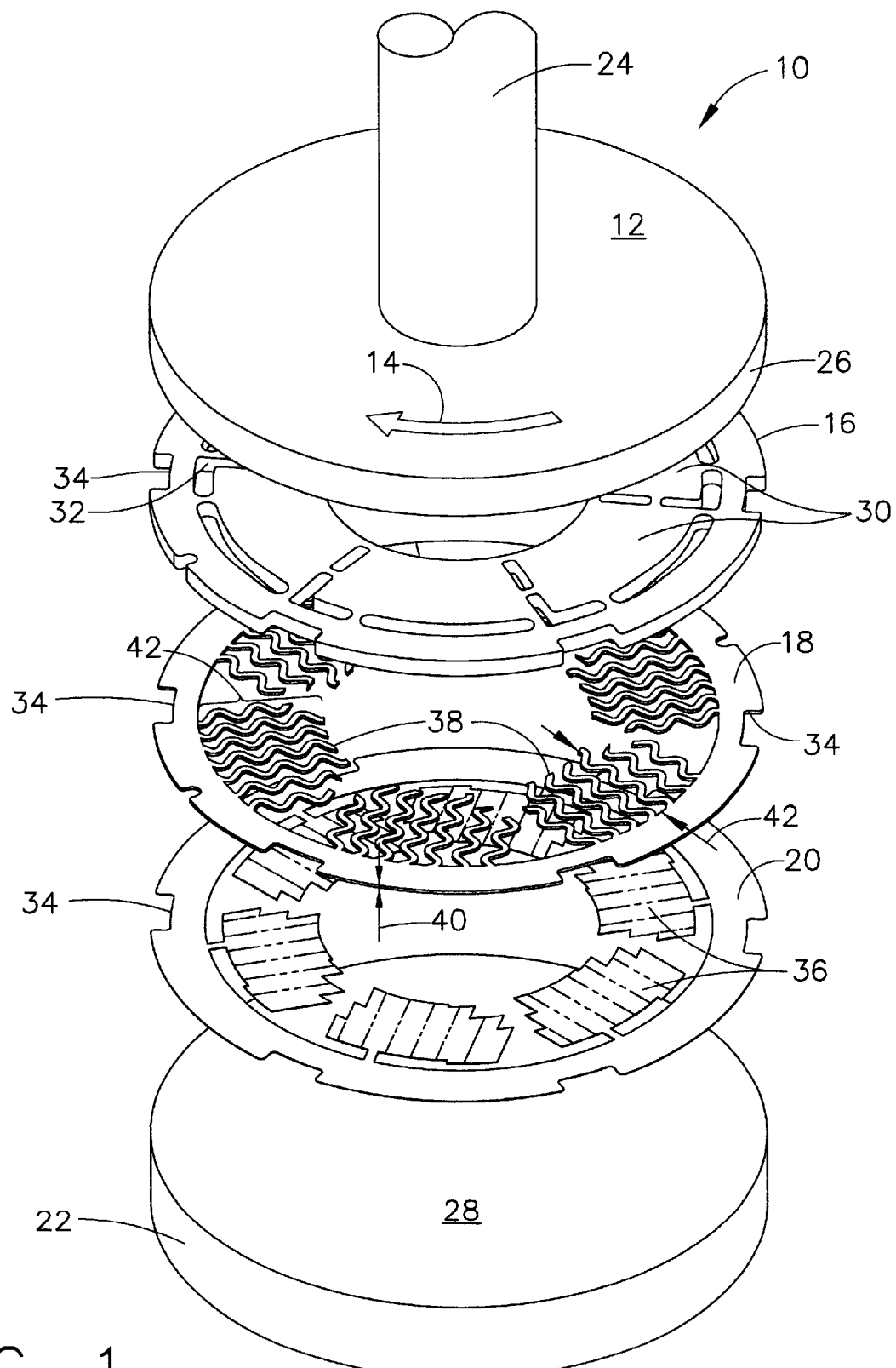
FIG. 1 is an exploded view of a foil thrust bearing according to one embodiment of the present invention.

Referring to the accompanying drawings (in which like reference numerals indicate like parts throughout several views), and in particular to FIG. 1, there is shown an exploded view of a foil thrust bearing 10 according to one embodiment of the present invention. The foil thrust bearing 10 generally may comprise a thrust runner 12, a thrust bearing disk 16 (also commonly referred to as top foil), an inventive turbulence generating disk 18, an underspring element 20, and a thrust plate 22 (also commonly referred to as a housing). While various applications for the foil thrust bearing 10 may be within the scope of the present invention, the foil thrust bearing 10 may be considered to have particular benefit in high speed rotating machinery, such as turboalternator-generators, turbocompressors, and motor driven compressors.

It can be seen that thrust runner 12 may be engaged to rotating shaft 24, thereby causing thrust runner 12 to rotate in the direction of arrow 14. Thrust runner 12 may include a runner surface 26 that faces opposite bearing surface 28 of thrust plate 22. Intermediate thrust runner 12 and thrust plate 22 may be thrust bearing disk 16, turbulence generating disk 18, and underspring element 20.

In operation, the spacing (not shown to scale) between thrust runner 12 and thrust plate 22 is filled with a fluid such as air. High speed rotation of thrust runner 12 in relation to thrust bearing disk 16 generates fluid pressure through viscous shear of the bearing lubricant. The load capacity of a foil thrust bearing 10 depends on the compliance of the bearing with hydrodynamic pressure exerted by the fluid film developed between the thrust runner 12 and the thrust bearing disk 16. Foils, such as thrust bearing disk 16, and springs, such as underspring element 20, are provided to enhance the hydrodynamic characteristics of the fluid bearing, to provide improved operation under extreme load conditions, to accommodate eccentricities of the relative movable elements, for cushioning and dampening, and to supply required compliance.

In the embodiment shown in FIG. 1, the two outer foils—thrust bearing disk 16 and underspring element 20—may be of the type shown in U.S. Pat. No. 6,224,263. Bearing disk 16 may be annularly shaped and may comprise a plurality of pads 30, slots 32, and notches 34. Pads 30 are provided for generating hydrodynamic (load carrying) pressure between the thrust runner 12 and the pads 30, while slots 32 are provided to allow for unrestricted cooling fluid flow. Notches 34 are further described below. Underspring element 20 may also be annularly shaped and may comprise a plurality of spring portions 36 and notches 34. These are shown by way of example only, as other types and numbers of thrust bearing disks 16 and underspring elements 20 may be provided.

Turbulence generating disk 18, which may be annularly shaped and may have thickness 40, is shown located between thrust bearing disk 16 and underspring element 20. A plurality of notches 34 may be positioned about the outer or circumferential edge of turbulence generating disk 18. The notches 34 may be aligned and configured, dimensionally and circumferentially, to match the corresponding notches 34 of the bearing disk 16 and underspring element 20. Notches 34 may be provided for unrestricted cooling flow, and like notches in various components (i.e., thrust bearing disk 16. underspring element 20, as well as cooling flow windows 48) are aligned for this purpose. Various means, such as dowel pins (not shown), may then be used to rotationally fix the relative positions of the turbulence generating disk 18, bearing disk 16 and underspring element 20 to the thrust plate 22. Turbulence generating disk 18 may further comprise a plurality of non-linearly shaped turbulator elements 38 of length 42, positioned about the inner annular ring edge, and directed radially toward the center of said turbulence generating disk 18. Other geometric details of said turbulence generating disk 18 may be as further described below.

Figure 2:
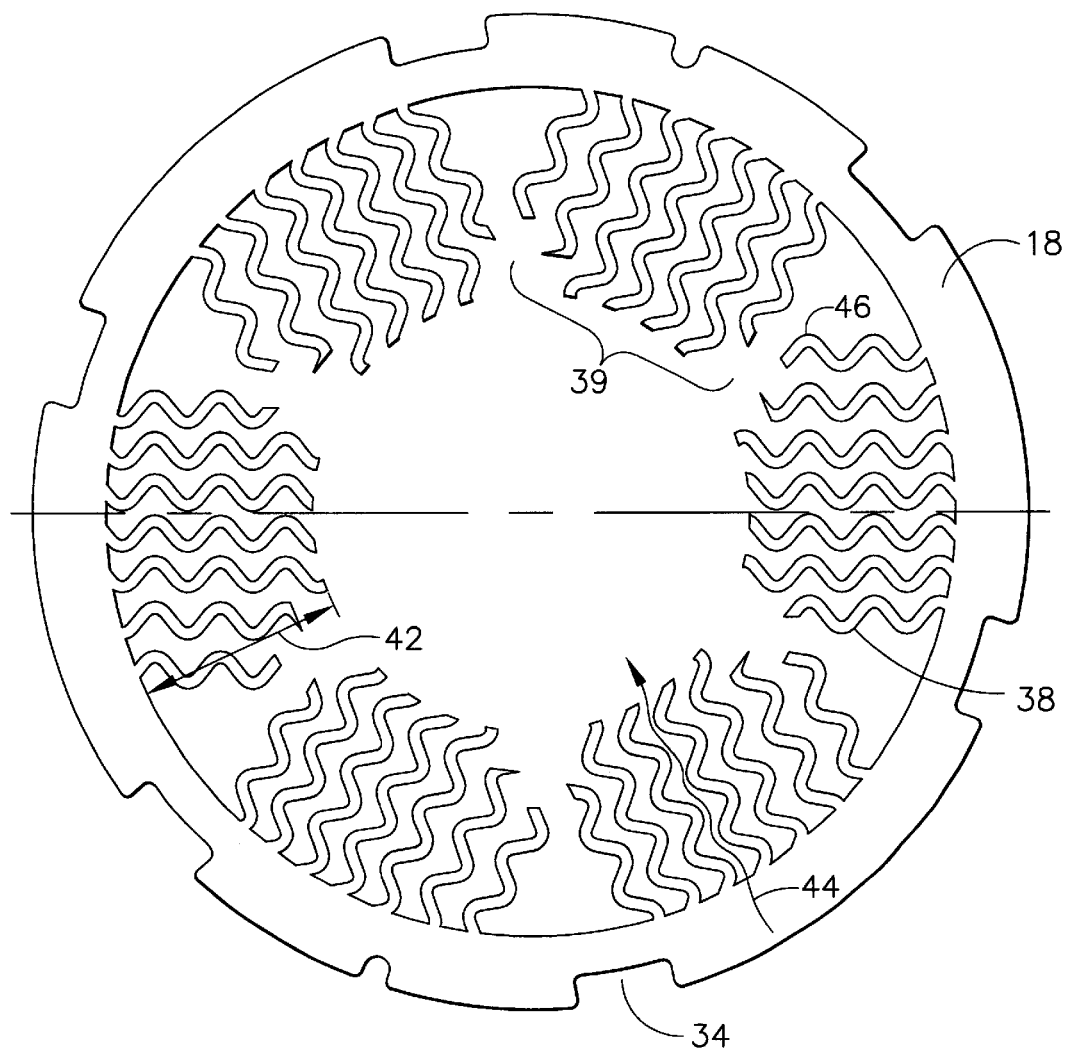
FIG. 2 is a plan view of a turbulence generating disk, which may be used for the foil thrust bearing of in FIG. 1.
Figure 9:
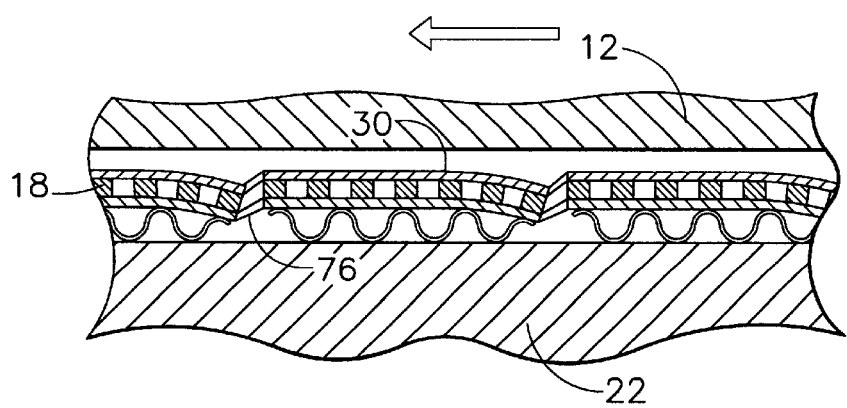
FIG. 9 is a cross sectional view a thrust bearing disk according to the previously illustrated embodiments with the addition of a turbulator support plate.

Referring now to FIG. 2, there is shown a plan view of a turbulence generating disk 18 which may be used in the foil thrust bearing 10 shown in FIG. 1. Turbulator elements 38 are shown in sets of seven located symmetrically between notches 34 and positioned on the inner or circumferential edge of said turbulence generating disk 18. Turbulator element sets 39 of seven turbulator elements 38 are shown by way of example only, as the actual number used may be dependent on the degree of cooling fluid flow turbulence desired as well as foil thrust bearing 10 geometric considerations, such as size and shape of foil disks, and number of spring corrugations. Additionally, the number and size/spacing of turbulator elements 38 may be determined by the number and pitch of the spring corrugations, since they are located at the peak of each spring corrugation between the underspring element 20 and thrust bearing disk 16. If the turbulator element spacing is not located at the peak of the spring corrugation, a turbulator support plate 76 may be added between the turbulator and the spring as shown in FIG. 9 (which is discussed further below). All turbulator elements 38 may be of equal as well as non-equal length 42 and non-linearly shaped in a wave pattern 46 so that cooling fluid flow transiting between them, as illustrated by flow arrow 44, may have a turbulent (as opposed to laminar) flow pattern.

Figure 3:
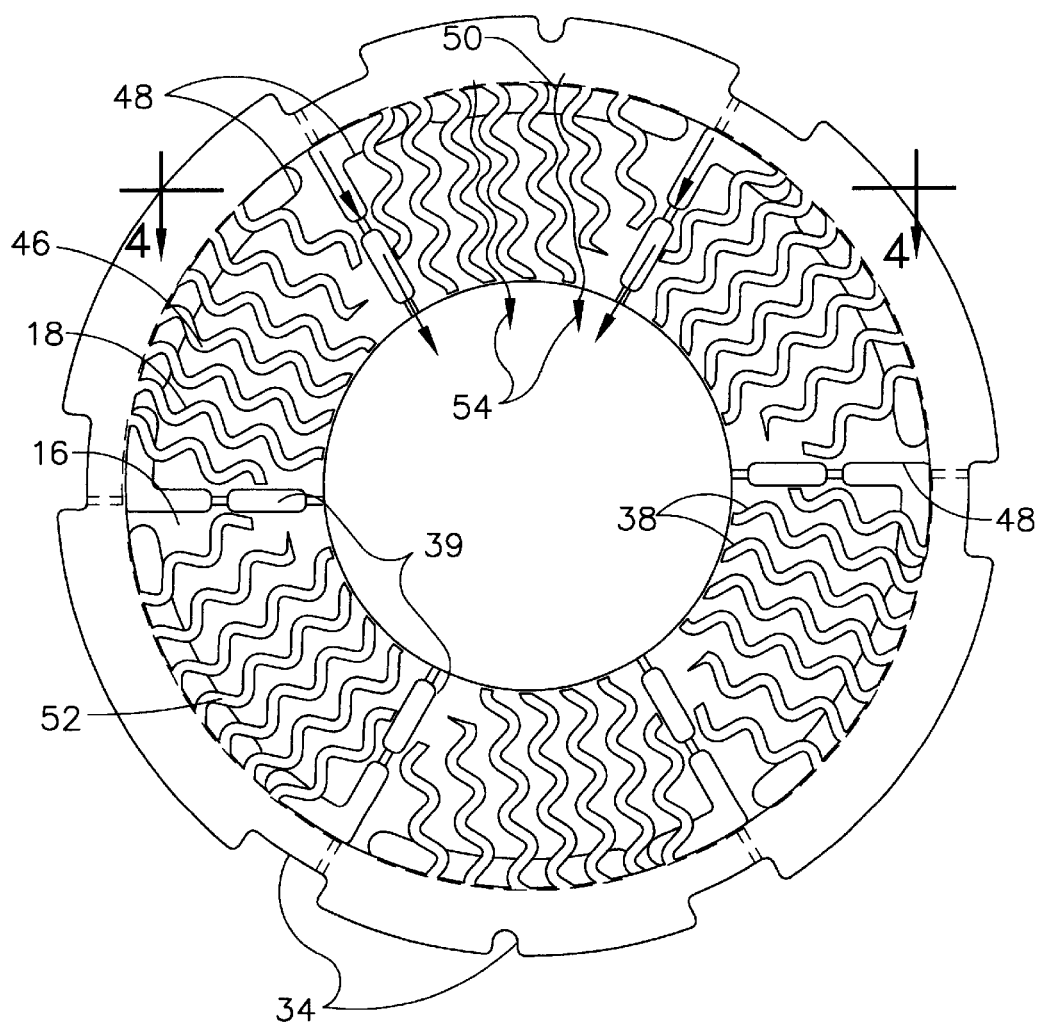
FIG. 3 is a bottom plan view of a turbulence generating disk superimposed on a thrust bearing disk.

FIG. 3 is a bottom plan view of a turbulence generating disk 18, superimposed over a thrust bearing disk 16 of the type shown on FIG. 1 and in U.S. Pat. No. 6,224,263. Notches 34 of both turbulence generating disk 18 and thrust bearing disk 16 may be superimposed over each other for unrestricted cooling flow, as explained above. Turbulator element sets 39 of seven are shown between notches 34. As indicated above, the number of turbulator elements 38 may depend on the degree of cooling flow turbulence desired as well as other design factors, such as foil thrust bearing 10 and thrust bearing disk 16 geometry.

Cooling fluid flow 50, typically supplied by diverting a small amount of fluid from, for example, the machine's compressor outlet, (not shown on FIG. 3), may flow through cooling flow windows 48 of thrust bearing disk 16, and may then be routed from the inner circumference 52 of turbulence generating disk 18 to and alongside the plurality of turbulator elements 38, as shown by turbulent flow 54 arrows. The non-linear wave pattern 46 shape of the turbulator elements 38 may cause turbulent flow 54 along the surface of thrust bearing disk 16, thus transferring heat away from thrust bearing disk 16. Turbulent flow may provide for more effective heat transfer then laminar flow, because of better mixing. In laminar (layered) flow, the layers close to the heat source soak up all the heat and the layers further away do not contribute well to the cooling. In turbulent flow the fluid is churning due to turbulent eddies and the fluid close to the heat source gets "stirred up" and is constantly being mixed with the cooler fluid further away. A further, corresponding benefit may be that a lesser amount of cooling fluid may be required to provide sufficient cooling.

Figure 4:
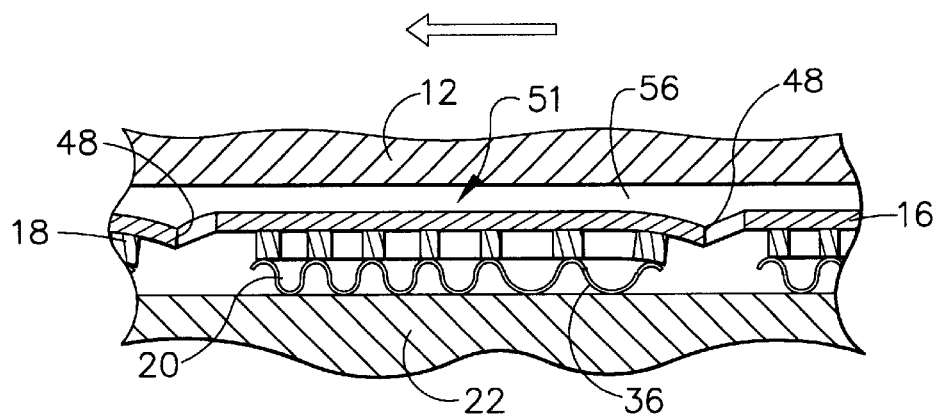
FIG. 4 is a cross sectional view of a turbulence generating disk superimposed on a thrust bearing disk taken across line A—A of FIG. 3.

Referring now to FIG. 4, there is shown a cross sectional view of turbulence generating disk 18 and thrust bearing disk 16, taken across line A—A of FIG. 3. Also shown on the vertical extremities of the sectional view are thrust runner 12, thrust plate 22, and underspring portions 36 of underspring element 20. In operation, high speed rotation of thrust runner 12 in relation to thrust disk 16 may generate heat within the hydrodynamic wedge 56. This heat may conduct through thrust disk 16 and may be transferred, via convection, to the cooling fluid flowing along the channels in turbulence generating disk 18.

The turbulence generating disk 18 described above and in FIGS. 1 through 4, may be made from a high thermal conductivity material such as copper or aluminum, although other materials, such as inconel, may be used effectively depending on the temperature and strength required for specific foil thrust bearing 10 applications. The same or similar high thermal conductivity materials may be used for the thrust bearing disk 16. The turbulence generating disks 18 may also be fabricated by means of a stamping or etching process.

FIGS. 1 through 4 illustrate an embodiment wherein the cooling fluid flow 50 is directed from the outside diameter to the inside diameter of the foil thrust bearing 10. The inventive turbulence generating disk 18, however, may operate as effectively if the cooling fluid flow is directed from the inside diameter to the outside diameter or optionally, from an intermediate diameter to the inside and outside diameters. Flow direction may be determined by the detailed geometric configuration of thrust bearing disks 16, underspring elements 20, and foil thrust bearing 10 housing (not shown). Also, some factors that may influence cooling flow direction may include (but are not limited to): application constraints, i.e., simplicity of machine design; balancing thrust loads; and, cooling flow control, i.e., sealing.

Figure 5:
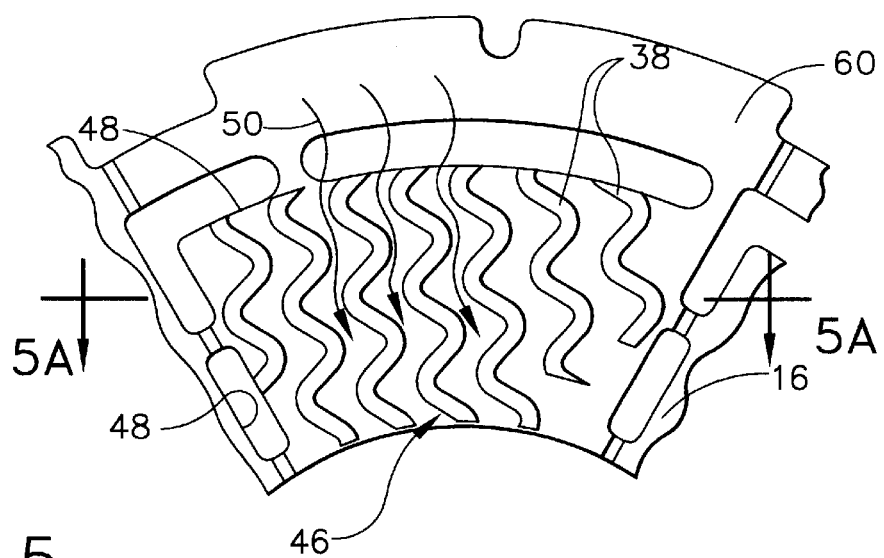
FIG. 5 is a partial plan view of the back surface of a thrust bearing disk according to another embodiment of the present invention.
Figure 5A:
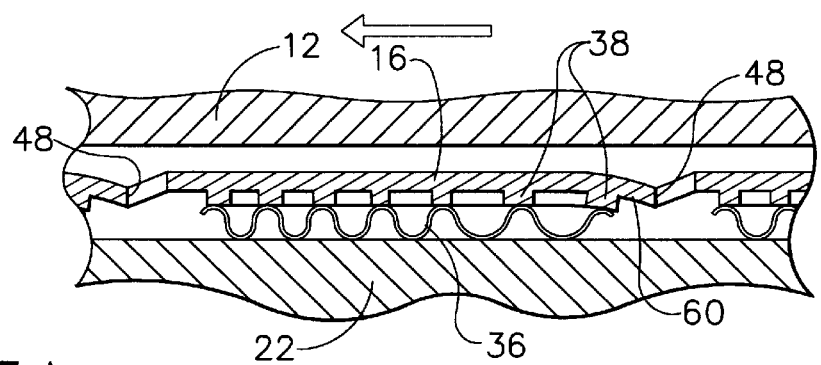
FIG. 5A is a cross sectional view of a thrust bearing disk taken across line B—B of FIG. 5.

Another embodiment of the present invention, shown on FIG. 5 also comprises a thrust bearing disk 16 of the type shown in U.S. Pat. No. 6,224,263. Said thrust bearing disk 16 may incorporate as part of its back surface 60 the turbulator element 38 wave pattern 46 that may generate the turbulent cooling fluid flow 50 shown by arrows. The wave pattern 46 may be similar to the pattern described in FIGS. 2 and 3, and may be photochemically etched directly on to the back surface 60 of thrust bearing disk 16. FIG. 5A is a cross sectional view of the thrust bearing disk 16 of FIG. 5, taken across line B—B of FIG. 5. The plurality of turbulator elements 38 is shown as being integral to the back surface 60 of thrust bearing disk 16. Also shown are the adjacently located spring portions 36 and thrust runner 12.

Figure 6:
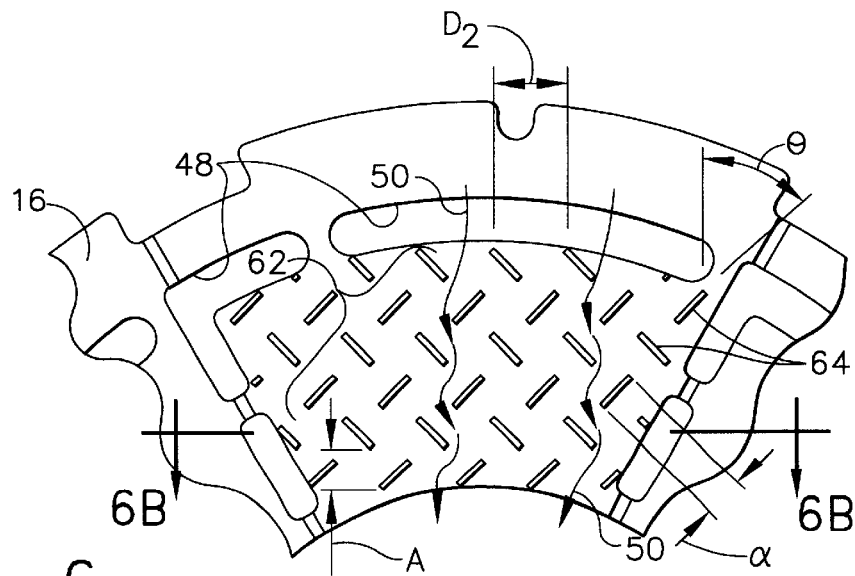
FIG. 6 is a partial plan view of the back surface of a thrust bearing disk according to another embodiment of the present invention.
Figure 6A:
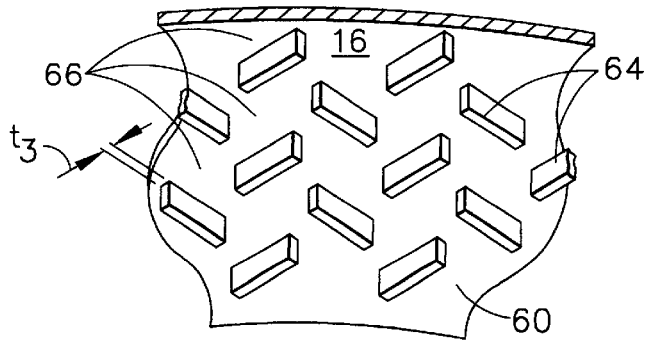
FIG. 6A is a partial perspective view of the back surface of the thrust bearing disk of FIG. 6.
Figure 6B:
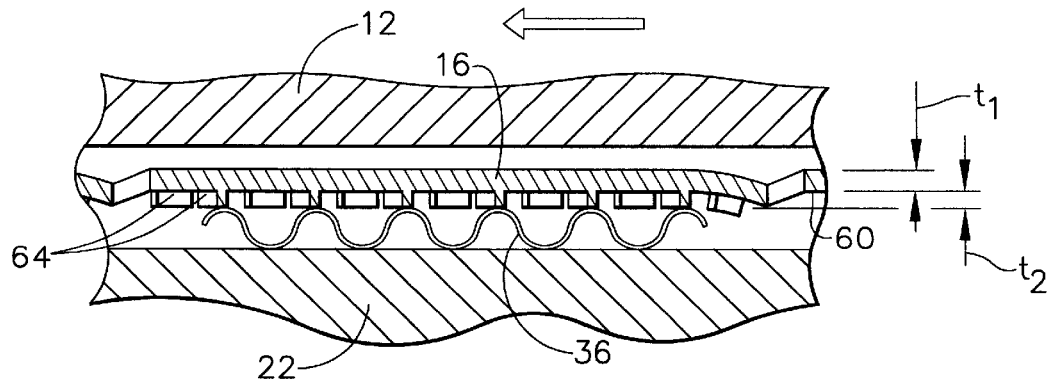
FIG. 6B is a cross sectional view of a thrust bearing disk taken across line C—C of FIG. 6.

FIG. 6 illustrates another embodiment of the present invention comprising a thrust bearing disk 16 of the type shown in U.S. Pat. No. 6,224,263, and which may incorporate as part of its back surface 60, a turbulence dam 62 pattern to generate turbulent cooling fluid flow 50. The turbulence dam 62 pattern may comprise a series of rectangular elements 64 integrally machined on the back surface 60 of thrust bearing disk 16. FIG. 6B is a partial perspective view of the back surface of said thrust bearing disk 16 illustrating a plurality of said rectangular elements 64 machined or chemically etched on back surface 60. The machining process may remove metal 66 from areas surrounding said rectangular elements 64, thus forming said rectangular elements 64. FIG. 6B is a cross sectional view of the thrust bearing disk 16 of FIG. 6, taken across line C—C of FIG. 6. The plurality of rectangular elements 64 is shown as being integral to back surface 60 of thrust bearing disk 16. Also shown are the adjacently located spring portions 36 and thrust runner 12. FIGS. 6, 6A and 6B illustrate various dimensional parameters ($P_1$, $P_2$, $t_1$, $t_2$, $t_3$, $\theta$, $\alpha$), which may be controlled to machine rectangular element 64 turbulence dams 62. Said dimensional values may be determined as a function of the size and geometric configuration of the foil thrust bearing 10 and thrust bearing disk 16, as well as the extent of cooling fluid flow 50 turbulence that may be necessary to remove the heat generated in the bearings. By way of example, for a typical air cycle machine thrust bearing, $P_1$, $P_2$, and $\alpha$ could be 0.25 inch, $t_1$, $t_2$, and $t_3$ could be between 0.002 to 0.050 inch, and $\theta$ could be 30 to 60 degrees.

Figure 7:
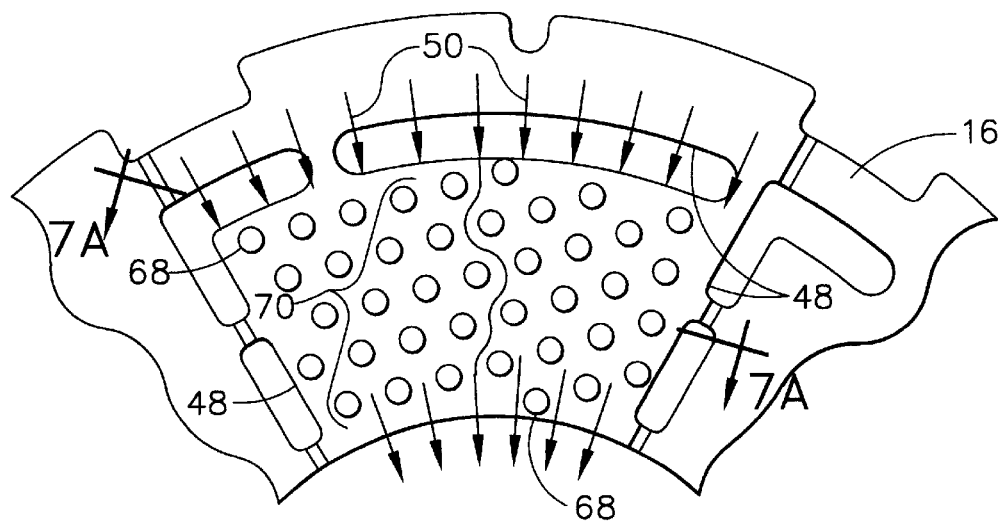
FIG. 7 is a partial plan view of the back surface of a thrust bearing disk according to yet another embodiment of the present invention.
Figure 7A:
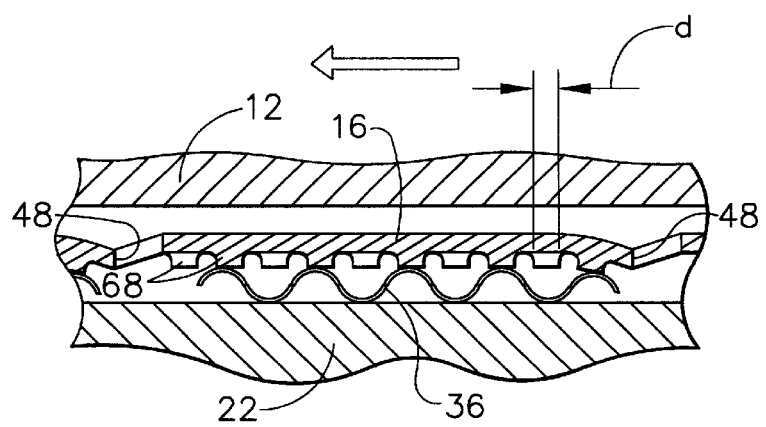
FIG. 7A a cross sectional view of a thrust bearing disk taken across line D—D of FIG. 7.

FIG. 7 illustrates yet another embodiment of the present invention comprising a thrust bearing disk 16 of the type shown in U.S. Pat. No. 6,224,263, and which may incorporate as part of its back surface 60, a pin pattern 70 to generate turbulent cooling fluid flow 50. The pin pattern 70 may comprise a series of pins 68 integrally machined or etched on the back surface 60 of thrust bearing disk 16. FIG. 7A is a cross sectional view of the thrust bearing disk 16 of FIG. 7, taken across line D—D of FIG. 7. The plurality of pins 68 may be integral to back surface 60 of thrust bearing disk 16. Also shown are the cooling flow windows 48 and the adjacently located spring portions 36, thrust runner 12, thrust plate 22. Dimensional parameters (such as pin 68 diameter d and pin pattern 70 spacing) may be controlled when machining or etching pin pattern 70. Said dimensional parameters may be determined as a function of the size and geometric configuration of foil thrust bearing 10 an thrust bearing disk 16, as well as the extent of cooling fluid flow 50 turbulence that may be necessary to remove the heat generated in the bearings.

Figure 8:
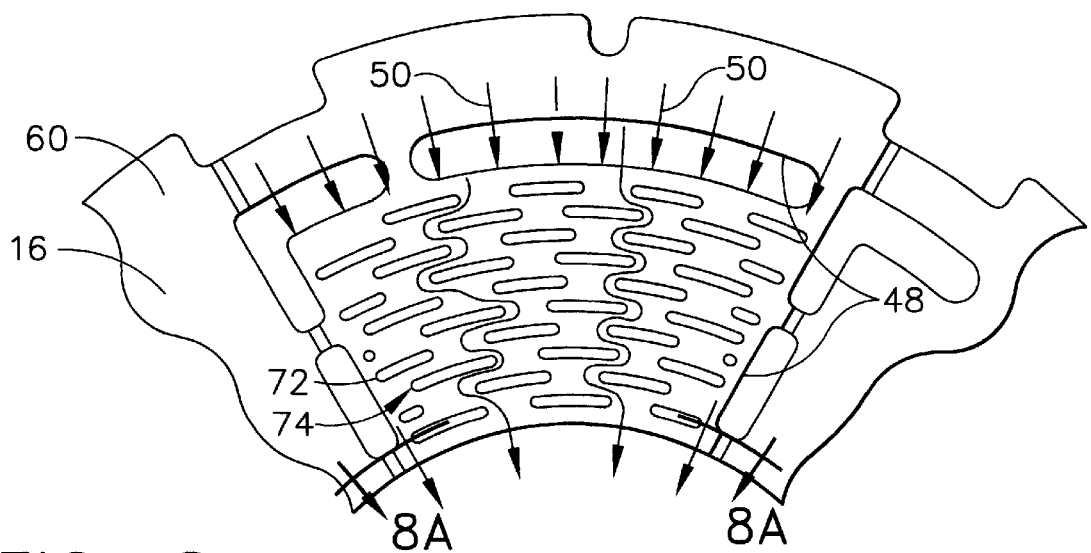
FIG. 8 is a partial plan view of the back surface of a thrust bearing disk according to yet one more embodiment of the present invention.
Figure 8A:
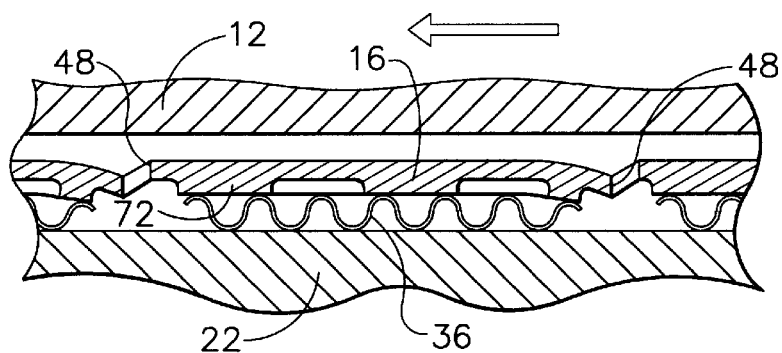
FIG. 8A is a cross sectional view of a thrust bearing disk taken across line E—E of FIG. 8.

FIG. 8 illustrates yet one more embodiment of the present invention comprising a thrust bearing disk 16 of the type shown in U.S. Pat. No. 6,224,263, and which may incorporate as part of its back surface 60, a radial block pattern 74 to generate turbulent cooling fluid flow 50. The radial block pattern 74 may comprise a series of radial blocks 72 integrally machined or etched on the back surface 60 of thrust bearing disk 16. FIG. 8A is a cross sectional view of the thrust bearing disk 16 of FIG. 8, taken across line E—E of FIG. 8. The plurality of radial blocks 72 may be integral to back surface 60 of thrust bearing disk 16. Also shown are the cooling flow windows 48 and the adjacently located spring portions 36, thrust runner 12, thrust plate 22. Dimensional parameters (such as radial block 72 height and radius, and radial block pattern 74 spacing) may be controlled when machining or etching radial block pattern 74. Said dimensional parameters may be determined as a function of the size and geometric configuration of foil thrust bearing 10 and thrust bearing disk 16, as well as the extent of cooling fluid flow 50 turbulence, which may be necessary to remove the heat generated in the bearings.

FIG. 9 illustrates yet one more embodiment of the present invention comprising a thrust bearing disk 16 of the type shown in U.S. Pat. No. 6,224,263, and which may incorporate as part of its back surface 60 any of the previous embodiments with the addition of a turbulator support plate 76 that supports the turbulator without the aid of the spring elements 36.

The thrust bearing disks 16 described in FIGS. 6, 7, 8, and 9, may be made from a high thermal conductivity material such as copper or aluminum, although other materials, such as inconel, may be used effectively depending on the temperature and strength required for specific foil thrust bearing 10 applications.

It should be understood, of course, that the foregoing relates to preferred embodiments of the invention and that modifications may be made without departing from the spirit and scope of the invention as set forth in the following claims.

We claim:

1. A foil thrust bearing, comprising
   a thrust runner and a thrust plate arranged for relative rotation with respect to one another, said thrust plate adapted to rotatably support said thrust runner;
   a thrust bearing disk operably disposed adjacent said thrust runner;
   an underspring element operably disposed adjacent said thrust plate;
   a turbulence generating disk operably disposed between said thrust bearing disk and said underspring element;
   a plurality of turbulator elements integral to said turbulence generating disk and directed radially toward the center of said turbulence generating disk;
   wherein said turbulator elements of said turbulence generating disk generate turbulent fluid flow.

2. The foil thrust bearing disk of claim 1, wherein said turbulence generating disk is annularly shaped.

3. The foil thrust bearing disk of claim 1, wherein said turbulator elements of said turbulence generating disk are of equal length and non-linearly shaped in a wave pattern.

4. The foil thrust bearing disk of claim 1, wherein said turbulator elements of said turbulence generating disk are of non-equal length.

5. The foil thrust bearing disk of claim 1, wherein said turbulator elements of said turbulence generating disk are in sets of no less than two.

6. The foil thrust bearing disk of claim 1, wherein said turbulence generating disk comprises a plurality of windows placed along the outer circumferential edge of said turbulence generating disk.

7. The foil thrust bearing disk of claim 1, wherein said turbulence generating disk is made of metal.

8. The foil thrust bearing disk of claim 1, wherein said turbulence generating disk is made of a non-metal material.

9. The foil thrust bearing disk of claim 1, wherein said turbulence generating disk is fabricated by stamping.

10. The foil thrust bearing disk of claim 1, wherein said turbulence generating disk is fabricated by etching.

11. The foil thrust bearing disk of claim 1, wherein said cooling fluid flow is directed from an inside diameter to an outside diameter of said foil thrust bearing.

12. The foil thrust bearing disk of claim 1, wherein said cooling fluid flow is directed from an intermediate diameter to an outside and an inside diameter of said foil thrust bearing.

13. The foil thrust bearing disk of claim 1, wherein said cooling fluid flow is directed from an outside diameter to an inside diameter of said foil thrust bearing.

14. The foil thrust bearing disk of claim 1, wherein said plurality of turbulator elements are integral to said thrust bearing disk.

15. The foil thrust bearing disk of claim 14, wherein said plurality of turbulator elements is photochemically etched directly on said thrust bearing disk.

16. The foil thrust bearing disk of claim 1, wherein said thrust bearing disk further comprises a plurality of rectangular elements forming a dam causing turbulence of said cooling fluid flow.

17. The foil thrust bearing disk of claim 1, wherein said thrust bearing disk further comprises a plurality of pins forming a pin pattern causing turbulent cooling fluid flow.

18. The foil thrust bearing disk of claim 1, wherein said thrust bearing disk further comprises a plurality of radial blocks forming a radial block pattern causing turbulent cooling fluid flow.

19. The foil thrust bearing disk of claim 1, wherein said plurality of turbulator elements are supported by a turbulator support plate.

20. A foil thrust bearing, comprising
a thrust runner and a thrust plate;
a thrust bearing disk adjacent said thrust runner;
an underspring element adjacent said thrust plate;
a turbulence generating disk between said thrust bearing disk and said underspring element, said turbulence generating disk comprising a plurality of turbulator elements directed radially toward the center;
wherein said turbulator elements of said turbulence generating disk generate turbulent fluid flow directed in a radial direction.

21. The foil thrust bearing disk of claim 20, wherein all said turbulator elements of said turbulence generating disk are in a wave pattern and in sets of no less than two.

22. The foil thrust bearing disk of claim 20, wherein said turbulence generating disk is made of a high thermal conductivity material.

23. The foil thrust bearing disk of claim 20, wherein said plurality of turbulator elements are part of said thrust bearing disk.

24. The foil thrust bearing disk of claim 20, wherein said thrust bearing disk further comprises rectangular elements forming a dam causing turbulence of said cooling fluid flow.

25. The foil thrust bearing disk of claim 20, wherein said thrust bearing disk further comprises a pin pattern causing turbulent cooling fluid flow.

26. The foil thrust bearing disk of claim 20, wherein said thrust bearing disk further comprises radial blocks forming a radial block pattern causing turbulent cooling fluid flow.

27. The foil thrust bearing disk of claim 20, wherein said plurality of turbulator elements are supported by a turbulator support plate.

28. A system for cooling foil thrust bearings for high speed rotating machinery, comprising
a foil thrust bearing comprising a thrust runner and a thrust plate arranged for relative rotation with respect to one another;
a thrust bearing disk disposed adjacent said thrust runner;
an underspring element disposed adjacent said thrust plate;
a turbulence generating disk, disposed between said thrust bearing disk and said underspring element, and comprising a plurality of turbulator elements positioned on an inner annular ring edge and directed radially toward a center of said turbulence generating disk;
wherein said turbulator elements generate turbulent fluid flow directed to said foil thrust bearing.

29. The system for cooling foil thrust bearings for high speed rotating machinery of claim 28, wherein said turbulator elements of said turbulence generating disk are wave patterned.

30. The system for cooling foil thrust bearings for high speed rotating machinery of claim 28, wherein said turbulence generating disk is made of a metal.

31. The system for cooling foil thrust bearings for high speed rotating machinery of claim 28, wherein said turbulator elements are part of said thrust bearing disk.

32. The system for cooling foil thrust bearings for high speed rotating machinery of claim 28, wherein rectangular elements forming a dam are provided on said thrust bearing disk causing turbulence on said cooling fluid flow.

33. The system for cooling foil thrust bearings for high speed rotating machinery of claim 28, wherein pins forming a pin pattern causing turbulent cooling fluid flow are provided on said thrust bearing disk.

34. The system for cooling foil thrust bearings for high speed rotating machinery of claim 28, wherein radial blocks forming a radial block pattern causing turbulent cooling fluid flow are provided on said thrust bearing disk.

35. The system for cooling foil thrust bearings for high speed rotating machinery of claim 28, wherein said plurality of turbulator elements are supported by a turbulator support plate.

36. A method for cooling foil thrust bearings for high speed rotating machinery, comprising the steps of
rotating a thrust runner in relation to a thrust plate;
rotating a thrust bearing disk and an underspring element between said rotating thrust runner and thrust plate;
rotating between said thrust bearing disk and said underspring element, a turbulence generating disk comprised of turbulator elements positioned on an inner annular ring edge and directed radially toward a center of said turbulence generating disk;

generating cooling fluid pressure by bleeding pressurized fluid from said high speed rotating machinery;

generating turbulent cooling fluid flow by directing said cooling fluid flow through said turbulator elements of said turbulence generating disk.

37. The method of claim 36, further comprising the step of generating turbulent cooling fluid flow by directing said cooling fluid flow through turbulator elements shaped in a wave pattern.

38. The method of claim 36, further comprising the step of generating turbulent cooling fluid flow by directing said cooling fluid flow through a plurality of rectangular elements forming a turbulence dam.

39. The method of claim 36, further comprising the step of generating turbulent cooling fluid flow by directing said cooling fluid flow through a plurality of pins forming a pin pattern.

40. The method of claim 36, further comprising the step of generating turbulent cooling fluid flow by directing said cooling fluid flow through a plurality of radial blocks forming a radial block pattern.

41. A method for cooling foil thrust bearings for rotating machinery, comprising the steps of rotating a thrust runner in relation to a thrust plate;

rotating a thrust bearing disk, a turbulence generating disk, and an underspring element between said rotating thrust runner and thrust plate;

generating cooling fluid pressure by bleeding pressurized fluid from said rotating machinery;

generating turbulent cooling fluid flow by directing said cooling fluid flow through said turbulence generating disk.

42. The method of claim 41, further comprising the step of generating turbulent cooling fluid flow by directing it through wave shaped turbulator elements.

43. The method of claim 41, further comprising the step of generating turbulent cooling fluid flow by directing it through a dam comprised of rectangular elements.

44. The method of claim 41, further comprising the step of generating turbulent cooling fluid flow by directing it through a pattern comprised of pins.

45. The method of claim 41, further comprising the step of generating turbulent cooling fluid flow by directing it through a pattern comprised of radial blocks.

* * * * *